(12) United States Patent
Carthon

(10) Patent No.: US 11,759,692 B2
(45) Date of Patent: Sep. 19, 2023

(54) TIME-OUT SYNCHRONIZED SYSTEM

(71) Applicant: Maria Ester Carthon, Stockbridge, GA (US)

(72) Inventor: Maria Ester Carthon, Stockbridge, GA (US)

(*) Notice: Subject to any disclaimer, the term of this patent is extended or adjusted under 35 U.S.C. 154(b) by 0 days.

(21) Appl. No.: 17/238,168

(22) Filed: Apr. 22, 2021

(65) Prior Publication Data
US 2021/0331058 A1 Oct. 28, 2021

Related U.S. Application Data

(60) Provisional application No. 62/704,133, filed on Apr. 22, 2020.

(51) Int. Cl.
*A63B 71/06* (2006.01)
*H04L 67/12* (2022.01)

(52) U.S. Cl.
CPC .. *A63B 71/0619* (2013.01); *A63B 2071/0655* (2013.01); *A63B 2225/54* (2013.01); *A63B 2225/74* (2020.08); *A63B 2243/0037* (2013.01); *H04L 67/12* (2013.01)

(58) Field of Classification Search
CPC ............ A63B 71/0619; A63B 71/0686; A63B 2225/74; A63B 2225/54; A63B 2225/50; A63B 2071/0655; A63B 2243/0037; H04L 67/12

USPC .......................................................... 473/415
See application file for complete search history.

(56) References Cited

U.S. PATENT DOCUMENTS

| | | | | |
|---|---|---|---|---|
| 6,144,620 | A * | 11/2000 | dePoortere | G04G 21/025 368/108 |
| 6,603,711 | B2 * | 8/2003 | Calace | A63B 71/0605 368/10 |
| 9,502,018 | B2 * | 11/2016 | Cronin | G04G 21/00 |
| 10,328,328 | B2 * | 6/2019 | Benkreira | G07C 1/28 |
| 10,602,929 | B1 * | 3/2020 | McKay | A61B 5/6806 |
| 2012/0063272 | A1 * | 3/2012 | Dorais | G07C 1/22 368/9 |

* cited by examiner

*Primary Examiner* — Allen Chan
(74) *Attorney, Agent, or Firm* — Charlena Thorpe, Esq.; Incorporating Innovation LLC

(57) ABSTRACT

Implementations of a time-out synchronized system are provided. In some implementations, the time-out synchronized system comprises a coach's device and a referee's device ("referee's wristband").

In some implementations, a method of using the time-out synchronized system comprises a coach using the coach's device to make a timeout call and a referee using the referee's wristband to be alerted and/or informed of the timeout call during an organized sports event, such as a basketball game.

10 Claims, 4 Drawing Sheets

TIME-OUT SYNCHRONIZED SYSTEM

CROSS REFERENCE TO RELATED APPLICATION

This application claims the benefit of U.S. patent application Ser. No. 62/704,133, which was filed on Apr. 22, 2020, and is incorporated herein by reference in its entirety.

TECHNICAL FIELD

This disclosure relates to implementations of a time-out synchronized system.

BACKGROUND

In organized sports, such as basketball, a timeout (or time-out) typically is called by a coach by yelling or signaling timeout. However, it may be difficult for the referee to hear or see a coach call a timeout during a game.

DETAILED DESCRIPTION

Implementations of a time-out synchronized system are provided. In some implementations, the time-out synchronized system comprises a coach's device and a referee's device ("referee's wristband").

In some implementations, the time-out synchronized system is configured for a coach to use to call a timeout (or time-out) during an organized sports event, such as a basketball game, or other suitable event and alert a referee of the timeout call, such as by the coach's device.

In some implementations, the time-out synchronized system is configured to alert a referee during an organized sports event, such as a basketball game, or other suitable event of a coach calling a timeout, such as by the referee's wristband.

In some implementations, the time-out synchronized system may be further configured to stop a game clock or similar time-keeping device automatically when a timeout is called, such as by the coach's device.

In some implementations, a method of using the time-out synchronized system comprises a coach using the coach's device to make a timeout call and a referee using the referee's wristband to be alerted and/or informed of the timeout call during an organized sports event, such as a basketball game, or other suitable event.

Figure 1:
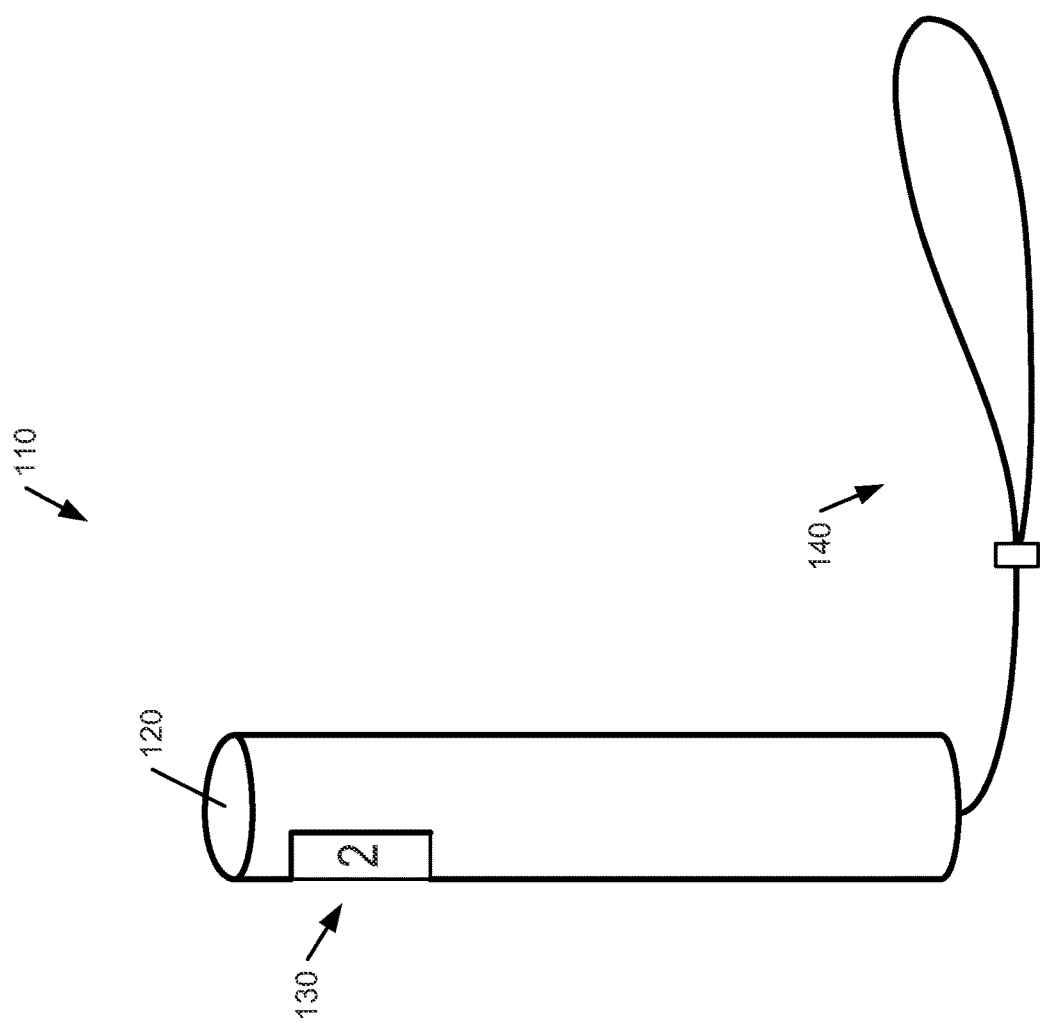
FIG. 1 illustrates an implementation of a coach's device of a time-out synchronized system according to the present disclosure.
Figure 2:
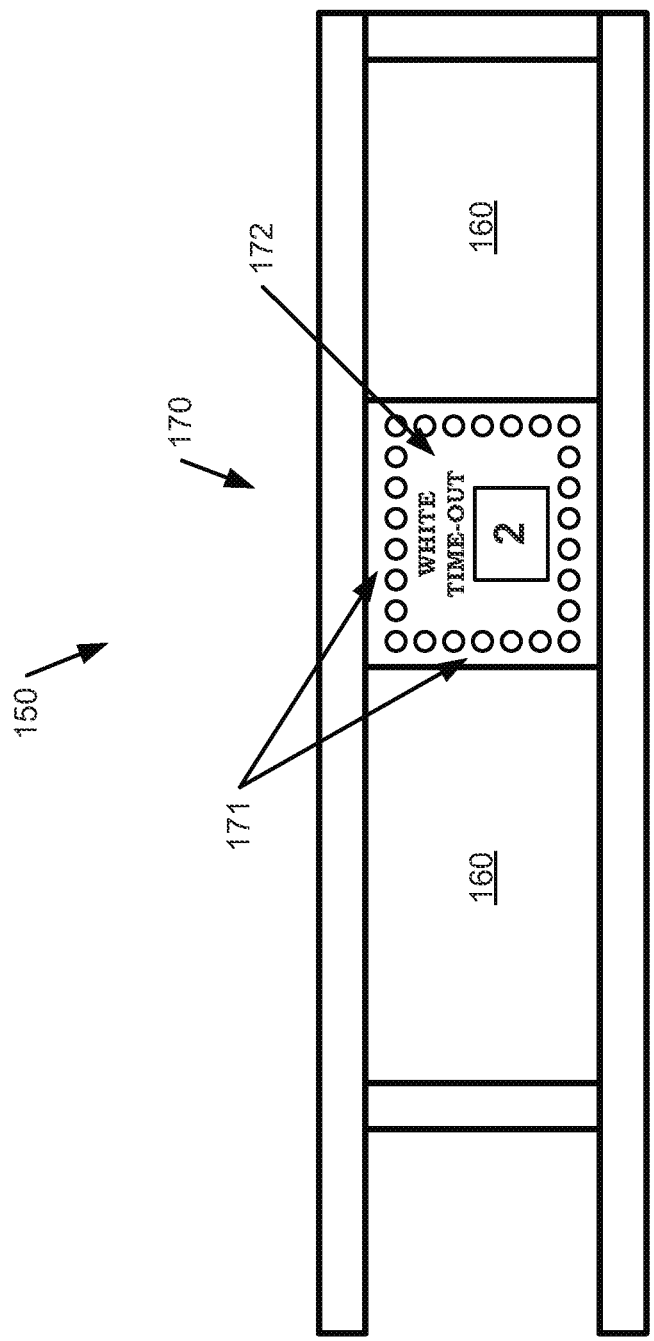
FIG. 2 illustrates an implementation of a referee's wristband of a time-out synchronized system according to the present disclosure.
Figure 3:
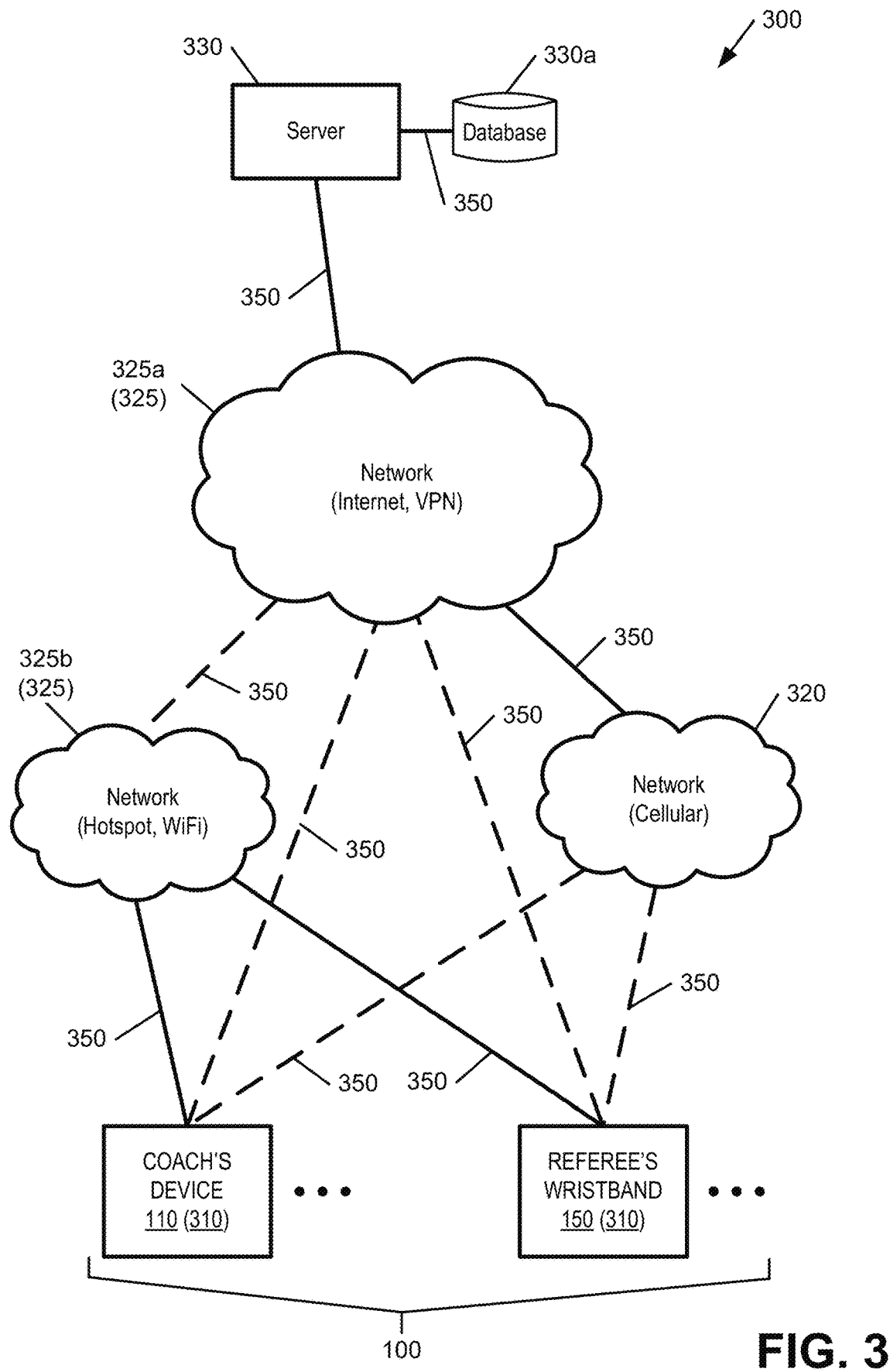
FIG. 3 illustrates an implementation of an example environment of a time-out synchronized system according to the present disclosure.

As shown in FIGS. 1-3, in some implementations, the time-out synchronized system 100 comprises a coach's device 110 and a referee's device ("referee's wristband") 150.

FIG. 1 illustrates an implementation of the coach's device 110 of the time-out synchronized system 100 according to the present disclosure. As shown in FIG. 1, in some implementations, the coach's device 110 comprises a button 120. In some implementations, the coach's device 110 may further comprise a display 130. In some implementations, the coach's device 110 may further comprise a carry strap 140.

In some implementations, the coach's device 110 may further comprise a computer system such as described below for FIGS. 3 and 4.

In some implementations, the button 120 may be any suitable pushbutton or similar device. In some implementations, the button 120 may be any suitable pushbutton or other device that can be pressed or otherwise engaged to operate the coach's device 110 such as described herein.

In some implementations, the button 120 may be any suitable size and any suitable shape such that the button 120 can be a component of the coach's device 110 that can be pressed or otherwise engaged to operate the coach's device 110 such as described herein.

In some implementations, the button 120 is configured to be pressed to activate the referee's wristband 150 to alert a referee that a timeout (or time-out) has been called.

In some implementations, the button 120 is configured to be pressed to call a timeout and alert the referee by activating the referee's wristband 150.

In some implementations, the display 130 may be any suitable display or similar device. In some implementations, the display 130 may be any suitable display or other device that can display from the coach's device 110 the number of available timeouts or other related information such as described herein.

In some implementations, the display 130 may be any suitable size and any suitable shape such that the display 130 can be a component of the coach's device 110 that can display the number of available timeouts or other related information such as described herein.

In some implementations, the display 130 is configured to inform a coach of the number of timeouts remaining. For example, in some implementations, the display 130 is configured to display the number of remaining timeouts.

In some implementations, the display 130 may be configured to display any other suitable information.

In some implementations, the carry strap 140 may be any suitable carry strap or similar component. In some implementations, the carry strap 140 may be any suitable carry strap or similar component that allows the coach's device 110 to be carried, worn, or otherwise secured around a user's wrist, neck, or other suitable area of the user.

For example, in some implementations, the carry strap 140 may comprise a wrist strap. In some implementations, the carry strap 140 may comprise a neck strap.

In some implementations, the carry strap 140 is configured to allow the coach's device 110 to be carried, worn, or otherwise secured around a user's wrist, neck, or other suitable area of the user.

In some implementations, the coach's device 110 may be any suitable size and any suitable shape such that the coach's device 110 can be used to call a timeout such as described herein. For example, in some implementations, the coach's device 110 may be any suitable size and any suitable shape such that the coach's device 110 can be carried, the button 120 can be pressed, and/or the display 130 can be viewed.

As shown in FIG. 1, in some implementations, the coach's device 110 may be generally cylindrical shaped and sized such that the coach's device 110 can be hand-held and the button 120 can be pressed and/or the display 130 can be viewed. For example, the coach's device 110 may comprise a cylindrical shaped housing configured to house the button 120, display 130, computer system, and/or other suitable components of the coach's device 110.

In some implementations, the coach's device 110 may comprise a computer system such as described below for FIGS. 3 and 4. For example, in some implementations, the coach's device 110 may comprise a system-on-chip (SOC) computer system, a single-board computer system (SBC), or any other suitable computer system.

In some implementations, the computer system may provide, control, and/or be connected to the button 120, the display 130, and/or any other suitable components of the coach's device 110.

In some implementations, the coach's device 110 may be configured to operate in a computer network environment such as described below for FIGS. 3 and 4. For example, in some implementations, the coach's device 110 may be configured to wirelessly communicate with the referee's wristband 150, such as to send a timeout alert thereto, and/or other devices in the computer network environment by the computer system.

In some implementations, the coach's device 110 is configured for a coach to use to call a timeout (or time-out) during an organized sports event, such as a basketball game, or other suitable event and to alert a referee of the timeout call, such as by pressing the button 120.

In some implementations, the coach's device 110 is configured to display the number of available timeouts or other related information, such as by the display 130.

In some implementations, the coach's device 110 is configured to be carried, worn, or otherwise secured around a user's wrist, neck, or other suitable area of the user, such as by the carry strap 140.

In some implementations, the coach's device 110 may be further configured to stop a game clock or similar timekeeping device automatically when a timeout is called using the coach's device 110, such as by pressing the button 120.

FIG. 2 illustrates an implementation of the referee's device ("referee's wristband") 150 of the time-out synchronized system 100 according to the present disclosure. As shown in FIG. 2, in some implementations, the referee's wristband 150 comprises a wristband 160 and an alert device 170. In some implementations, the referee's wristband 150 may further comprise a computer system such as described below for FIGS. 3 and 4.

In some implementations, the wristband 160 may be any suitable wristband or similar apparatus that can be worn on a user's wrist or other suitable area of the user. For example, as shown in FIG. 2, the wristband 160 may comprise a suitably shaped and sized piece of suitably flexible material that can be worn on a user's wrist or other suitable area of the user.

In some implementations, the wristband 160 may comprise any suitable components in any suitable configuration such that the wristband 160 can be worn on a user's wrist or other suitable area of the user. For example, in some implementations, the wristband may comprise any suitable closure in any suitable configuration, such as a hook and loop closure, a snap closure, or a tie closure.

In some implementations, wristband 160 may comprise one or more straps or similar components that allow the wristband 160 to be worn on a user's wrist or other suitable area of the user.

In some implementations, the wristband 160 is configured to be worn on a user's wrist or other suitable area of the user such that referee's wristband 150 can be used such as described herein. For example, in some implementations, the wristband 160 is configured to be worn such that a referee can use the referee's wristband 150, such as using the alert device 170.

In some implementations, the alert device 170 may comprise any suitable components to alert and/or inform a user of the referee's wristband 150, such as a referee, that a timeout has been called using the coach's device 110, such as by a coach. For example, as shown in FIG. 2, in some implementations, the alert device may comprise a visual alert device 171 and a display 172.

In some implementations, the alert device 170 may comprise other suitable components such as a tactile (e.g., vibrating) alert device and/or an audible alert device.

In some implementations, the visual alert device 171 may comprise any suitable device and/or components that can visually alert a user of the referee's wristband 150, such as a referee, that a timeout has been called using the coach's device 110, such as by a coach. For example, in some implementations, the visual alert device 171 may comprise lighting such as one or more light emitting diodes (LEDs) or other suitable lighting components.

In some implementations, the lighting of the visual alert device 171 may be colored and/or color-coordinated. For example, in some implementations, the lighting of the visual alert device 171 may be configured to light in one or more colors corresponding to the alert, such as to indicate for which team a timeout has been called using the coach's device 110.

In some implementations, the lighting of the visual alert device 171 may be configured to light in any suitable way, such as continuous, blinking, varying intensity, etc. In some implementations, the lighting of the visual alert device 171 may be configured to light in such way to provide an indication related to a timeout called using the coach's device 110.

In some implementations, the visual alert device 171 may be any suitable size and any suitable shape such that the visual alert device 171 can be a component of the referee's wristband 150 that can visually alert a user of the referee's wristband 150 such as described herein.

In some implementations, the display 172 may be any suitable display or similar device. In some implementations, the display 172 may be any suitable display or other device that can display from the referee's wristband 150 information about a timeout called using the coach's device 110 or other related information such as described herein.

For example, in some implementations, the display 172 may be configured to display the locale (e.g., home or visitor) and/or name of the team for which a timeout has been called using the coach's device 110. In some implementations, the display 172 may be configured to display the number of remaining timeouts for the team for which a timeout has been called using the coach's device 110.

In some implementations, the display 172 may be configured to display any other suitable information.

In some implementations, the display 172 may be any suitable size and any suitable shape such that the display 172 can be a component of the referee's wristband 150 that can display information about a timeout called using the coach's device 110 or other related information such as described above.

In some implementations, the display 172 may configured to inform a referee of the identity (e.g., locale and/or name) of the team for which a timeout has been called using the coach's device 110. In some implementations, the display 172 may be configured to inform a referee of the number of remaining timeouts for the team for which a timeout has been called using the coach's device 110.

In some implementations, the display 172 may be configured to inform a referee of any other suitable information.

In some implementations, the tactile (e.g., vibrating) alert device may comprise any suitable device and/or components that can tactilely (e.g., by vibration) alert a user of the referee's wristband 150, such as a referee, that a timeout has been called using the coach's device 110, such as by a coach.

In some implementations, the tactile alert device may be configured to tactilely alert a user of the referee's wristband 150 in any suitable way (such as similar to the visual alert device 171 described above) that a timeout has been called using the coach's device 110.

In some implementations, the audible alert device may comprise any suitable device and/or components that can audibly alert a user of the referee's wristband 150, such as a referee, that a timeout has been called using the coach's device 110, such as by a coach.

In some implementations, the audible alert device may be configured to audibly alert a user of the referee's wristband 150 in any suitable way (such as similar to the visual alert device 171 described above) that a timeout has been called using the coach's device 110.

In some implementations, the referee's wristband 150 may comprise a computer system such as described below for FIGS. 3 and 4. For example, in some implementations, the referee's wristband 150 may comprise a system-on-chip (SOC) computer system, a single-board computer system (SBC), or any other suitable computer system.

In some implementations, the computer system may provide, control, and/or be connected to the alert device 170, such as the visual alert device 171 and/or the display 172, and/or any other suitable components of the referee's wristband 150.

In some implementations, the referee's wristband 150 may be configured to operate in a computer network environment such as described below for FIGS. 3 and 4. For example, in some implementations, the referee's wristband 150 may be configured to wirelessly communicate with the coach's device 110, such as to receive a timeout alert therefrom, and/or other devices in the computer network environment by the computer system.

In some implementations, the referee's wristband 150 is configured to alert and/or inform a user, such as a referee, that a timeout has been called using the coach's device 110, such as by a coach.

In some implementations, the referee's wristband 150 is configured to alert and/or inform a user of a timeout called using the coach's device 110 by a visual alert and/or an information display.

In some implementations, the referee's wristband 150 may be configured to alert and/or inform a user of a timeout called using the coach's device 110 by a tactile (e.g., vibrating) alert and/or an audible alert.

In some implementations, the referee's wristband 150 is configured to be worn on a user's wrist or other suitable area of the user.

In some implementations, the time-out synchronized system 100 is configured for a coach to use to call a timeout (or time-out) during an organized sports event, such as a basketball game, or other suitable event and alert a referee of the timeout call, such as by the coach's device 110.

In some implementations, the time-out synchronized system 100 is configured to alert a referee during an organized sports event, such as a basketball game, or other suitable event of a coach calling a timeout, such as by the referee's wristband 150.

In some implementations, the time-out synchronized system 100 may be further configured to stop a game clock or similar time-keeping device automatically when a timeout is called, such as by the coach's device 110.

In some implementations, the components of the time-out synchronized system 100 comprises any suitable dimensions. For example, as shown in FIG. 1, in some implementations, the coach's device 110 may be approximately five inches long.

In some implementations, the components of the time-out synchronized system 100 are composed of any suitable materials.

In some implementations, the components of the time-out synchronized system 100 can have any suitable appearance.

In some implementations, an example method of using the time-out synchronized system 100, with respect to the figures described herein, comprises a coach using the coach's device 110 and a referee using the referee's wristband 150 during an organized sports event, such as a basketball game, or other suitable event.

In some implementations, the coach hand-holds the coach's device 110. In some implementations, the coach carries, wears, or otherwise secures the coach's device 110 with the carry strap 140 around the coach's wrist, neck, or other suitable area of the coach.

In some implementations, the referee wears the referee's wristband 150 on the referee's wrist or other suitable area of the referee.

In some implementations, the method comprises the coach using the coach's device 110 to call a timeout (or time-out) to the referee using the referee's wristband 150.

In some implementations, the coach presses the button 120 of the coach's device 110 to call a timeout and alert the referee by activating the referee's wristband 150.

In some implementations, the coach is informed by the display 130 of the coach's device 110 of the number of remaining timeouts for the coach's team.

In some implementations, the referee is alerted by the visual alert device 171 or other suitable alert device of the referee's wristband 150 of the coach's timeout call made using the coach's device 110.

In some implementations, the referee is informed by the display 172 of the referee's wristband 150 of the identity (e.g., locale and/or name) of the team and the number of remaining timeouts for the team for which the timeout was called by the coach using the coach's device 110.

In some implementations, the game clock or similar time-keeping device may be automatically stopped when the coach presses the button 120 to call the timeout using the coach's device 110.

FIG. 3 illustrates an implementation of an example environment 300 of a time-out synchronized system 100 according to the present disclosure.

As shown in FIG. 3, in some implementations, the environment 300 may include one or more client devices 310 (e.g., a coach's device 110 and a referee's wristband 150), a wireless cellular network 320, a network 325 (e.g., an Internet/VPN network 325a and a hotspot/Wi-Fi/captive-Wi-Fi network 325b), and one or more servers 330. In some implementations, the environment 300 may also include one or more data storage 330a linked to the server 330.

The client device 310 is depicted as a coach's device 110 and a referee's wristband 150, but the client device 310 may comprise any type of computing device, such as a desktop computer system, a laptop, cellular phone, a smart device, a mobile telephone, a tablet-style computer, or any other device capable of wireless or wired communication. In some implementations, client device 310 is configured to interact with the server 330 via an application, such as a web browser or a native application, residing on the client device 310.

In some implementations, the client devices 310 include hardware, software, or embedded logic components or a combination of two or more such components and is configured to carry out the appropriate functions implemented or supported by the client devices 310.

In some implementations, the client devices 310 may include one or more processors, one or more memories, one or more displays, one or more interfaces, one or more components capable of inputting data, one or more components capable of outputting data, one or more components capable of communicating with any other component of the environment 300 or any other component suitable for a particular purpose.

In some implementations, the client devices 310 are configured to access networks 320 and/or 325. In some implementations, the client devices 310 are configured to communicate with servers 330.

In some implementations, the client device 310 can connect to the network 325 through a wireless cellular network 320, such as GPRS-based and CDMA-based wireless networks, as well as 802.16 WiMax and long-range wireless data networks.

In some implementations, components of the environment 300 may communicate with any other component of the environment 300 over network 325. Network 325 may be any suitable network. In some implementations, for example, one or more portions of network 325 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another network 325, or a combination of two or more of the foregoing.

In some embodiments, components of the environment 300 may be configured to communicate over links 350. Links 350 may connect components of the environment 300 to networks 320, 325 or to each other. In some implementations, one or more links 350 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links 350. Links 350 may not be the same throughout the environment 300.

In some implementations, the server devices 330 may include a processor, memory, user accounts, and one or more modules to perform various functions such as those described above.

In some implementations, each server 330 may be a unitary server or may be a distributed server spanning multiple computers or multiple datacenters. Servers 330 may be of various types, such as, for example and without limitation, web server, file server, application server, exchange server, database server, or proxy server. In some implementations, each server 330 may include hardware, software, or embedded logic components or a combination of two or more such components for carrying out the appropriate functionalities implemented or supported by server 330. For example, a web server is generally capable of hosting websites containing web pages or particular elements of web pages. More specifically, a web server may host HTML files or other file types, or may dynamically create or constitute files upon a request, and communicate them to clients 310 in response to HTTP or other requests from clients 310. A database server is generally capable of providing an interface for managing data stored in one or more data stores.

In some implementations, one or more data storages 330a may be communicatively linked to one or more servers 330, respectively, via one or more links 350. In some implementations, data storages 330a may be used to store various types of information. In some implementations, the information stored in data storages 330a may be organized according to specific data structures. In particular embodiment, each data storage 330a may be a relational database. Particular embodiments may provide interfaces that enable servers 330 or clients 310 to manage, e.g., retrieve, modify, add, or delete, the information stored in data storage 330a.

Figure 4:
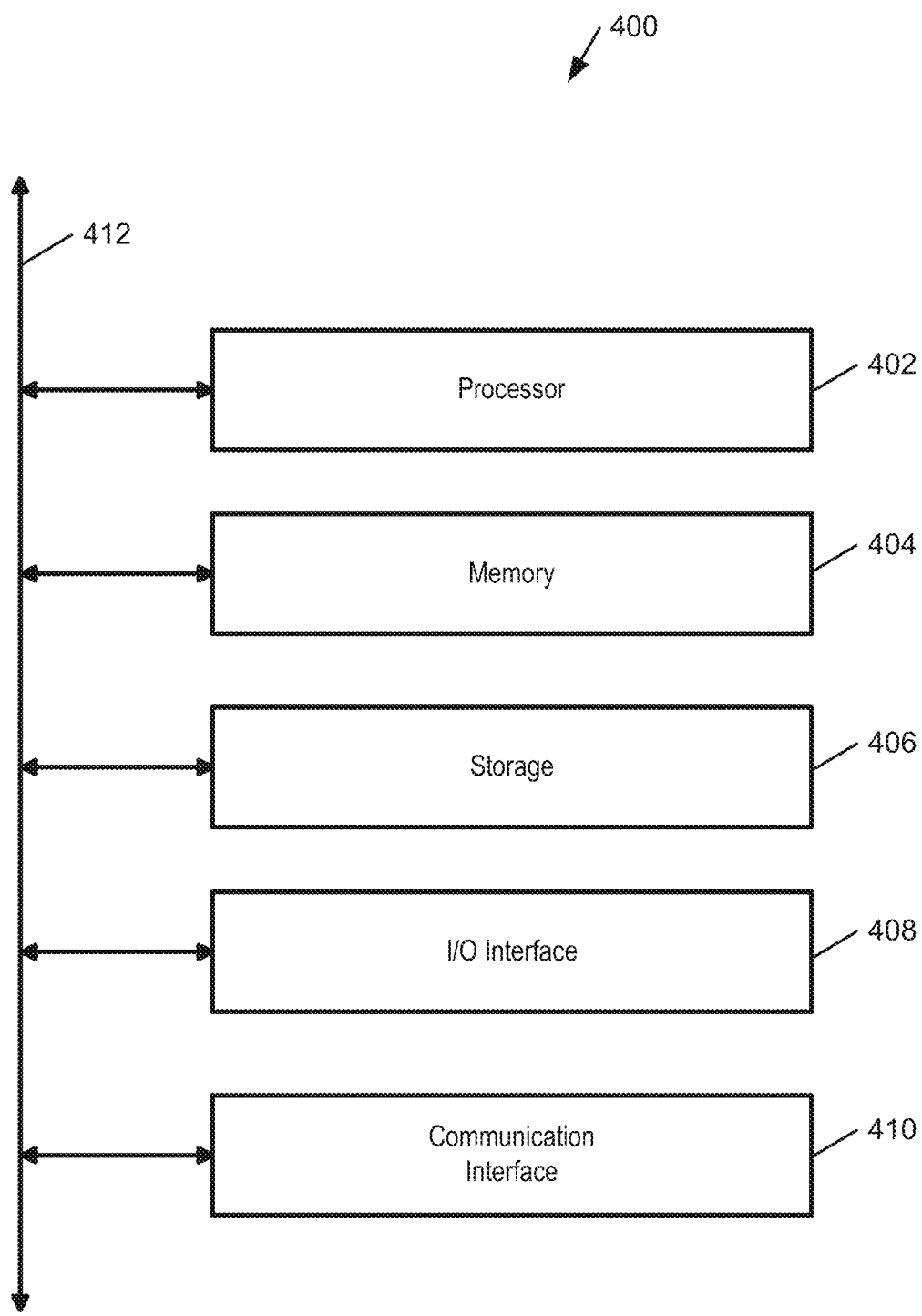
FIG. 4 illustrates an example computer system, which may be used with implementations of the present disclosure.

FIG. 4 illustrates an example computer system 400, which may be used with some implementations of the present invention. This disclosure contemplates any suitable number of computer systems 400.

This disclosure contemplates computer system 400 taking any suitable physical form. In some implementations, as an example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop, an interactive kiosk, a mainframe, a mesh of computer systems, a mobile telephone, a personal digital assistant (PDA), a server, or a combination of two or more of these.

In some implementations, where appropriate, computer system 400 may include one or more computer systems 400; be unitary or distributed; span multiple locations; span multiple machines; or reside in a cloud, which may include one or more cloud components in one or more networks.

In some implementations, where appropriate, one or more computer systems 400 may perform without substantial spatial or temporal limitation one or more steps of one or more methods described or illustrated herein. In some implementations, as an example and not by way of limitation, one or more computer systems 400 may perform in real time or in batch mode one or more steps of one or more methods described or illustrated herein. In some implementations, one or more computer systems 400 may perform at different times or at different locations one or more steps of one or more methods described or illustrated herein, where appropriate.

In some implementations, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In some implementations, processor 402 includes hardware for executing instructions, such as those making up a computer program. In some implementations, as an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406.

In some implementations, processor 402 may include one or more internal caches for data, instructions, or addresses. The present disclosure contemplates processor 402 including any suitable number of any suitable internal caches, where appropriate. In some implementations, as an example and not by way of limitation, processor 402 may include one or more instruction caches, one or more data caches, and one or more translation look-aside buffers (TLBs).

In some implementations, instructions in the instruction caches may be copies of instructions in memory 404 or storage 406, and the instruction caches may speed up retrieval of those instructions by processor 402.

In some implementations, data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data.

In some implementations, the data caches may speed up read or write operations by processor 402. In some implementations, the TLBs may speed up virtual-address translation for processor 402.

In some implementations, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In some implementations, memory 404 includes main memory for storing instructions for processor 402 to execute or data for processor 402 to operate on. In some implementations, as an example and not by way of limitation, computer system 400 may load instructions from storage 406 or another source (such as, for example, another computer system 400) to memory 404.

In some implementations, processor 402 may then load the instructions from memory 404 to an internal register or internal cache. In some implementations, to execute the instructions, processor 402 may retrieve the instructions from the internal register or internal cache and decode them.

In some implementations, during or after execution of the instructions, processor 402 may write one or more results (which may be intermediate or final results) to the internal register or internal cache. In some implementations, processor 402 may then write one or more of those results to memory 404.

In some implementations, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

In some implementations, one or more memory buses (which may each include an address bus and a data bus) may couple processor 402 to memory 404. In some implementations, bus 412 may include one or more memory buses, as described below.

In some implementations, one or more memory management units (MMUs) reside between processor 402 and memory 404 and facilitate accesses to memory 404 requested by processor 402.

In some implementations, memory 404 includes random access memory (RAM). In some implementations, this RAM may be volatile memory, where appropriate.

In some implementations, where appropriate, this RAM may be dynamic RAM (DRAM) or static RAM (SRAM). Moreover, in some implementations, where appropriate, this RAM may be single-ported or multi-ported RAM. The present disclosure contemplates any suitable RAM.

In some implementations, memory 404 may include one or more memories 404, where appropriate. Although this disclosure describes and illustrates particular memory, this disclosure contemplates any suitable memory.

In some implementations, storage 406 includes mass storage for data or instructions. In some implementations, as an example and not by way of limitation, storage 406 may include an HDD, a floppy disk drive, flash memory, an optical disc, a magneto-optical disc, magnetic tape, or a Universal Serial Bus (USB) drive or a combination of two or more of these.

In some implementations, storage 406 may include removable or non-removable (or fixed) media, where appropriate. In some implementations, storage 406 may be internal or external to computer system 400, where appropriate. In some implementations, storage 406 is non-volatile, solid-state memory.

In some implementations, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form.

In some implementations, storage 406 may include one or more storage control units facilitating communication between processor 402 and storage 406, where appropriate. In some implementations, where appropriate, storage 406 may include one or more storages 406. Although this disclosure describes and illustrates particular storage, this disclosure contemplates any suitable storage.

In some implementations, I/O interface 408 includes hardware, software, or both providing one or more interfaces for communication between computer system 400 and one or more I/O devices. In some implementations, computer system 400 may include one or more of these I/O devices, where appropriate.

In some implementations, one or more of these I/O devices may enable communication between a person and computer system 400. In some implementations, as an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

In some implementations, an I/O device may include one or more sensors. This disclosure contemplates any suitable I/O devices and any suitable I/O interfaces 408 for them.

In some implementations, where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In some implementations, communication interface 410 includes hardware, software, or both providing one or more interfaces for communication (such as, for example, packet-based communication) between computer system 400 and one or more other computer systems 400 or one or more networks.

In some implementations, as an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

In some implementations, as an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these.

In some implementations, one or more portions of one or more of these networks may be wired or wireless. In some implementations, as an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In some implementations, computer system 400 may include any suitable communication interface 410 for any of these networks, where appropriate. In some implementations, communication interface 410 may include one or more communication interfaces 410, where appropriate. Although this disclosure describes and illustrates a particular communication interface, this disclosure contemplates any suitable communication interface.

In some implementations, bus 412 includes hardware, software, or both coupling components of computer system 400 to each other. In some implementations, as an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these.

In some implementations, bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. In some implementations, as an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate.

Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In some implementations, a computer-readable storage medium implements one or more portions of processor 402 (such as, for example, one or more internal registers or caches), one or more portions of memory 404, one or more portions of storage 406, or a combination of these, where appropriate.

In some implementations, a computer-readable storage medium implements RAM or ROM. In some implementations, a computer-readable storage medium implements volatile or persistent memory.

In some implementations, one or more computer-readable storage media embody software. Herein, reference to software may encompass one or more applications, bytecode, one or more computer programs, one or more executables, one or more instructions, logic, machine code, one or more scripts, or source code, and vice versa, where appropriate.

In some implementations, software includes one or more application programming interfaces (APIs). This disclosure contemplates any suitable software written or otherwise expressed in any suitable programming language or combination of programming languages.

In some implementations, software is expressed as source code or object code. In some implementations, software is expressed in a higher-level programming language, such as, for example, C, Perl, or a suitable extension thereof. In some implementations, software is expressed in a lower-level programming language, such as assembly language (or machine code).

In some implementations, software is expressed in JAVA. In some implementations, software is expressed in Hyper Text Markup Language (HTML), Extensible Markup Language (XML), or other suitable markup language.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example. it will apparent to one of ordinary skill in the art that the invention may be used with any electronic network service, even if it is not provided through a website.

Any computer-based system that provides networking functionality can be used in accordance with the present invention even if it relies, for example, on e-mail, instant messaging or other forms of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The present disclosure encompasses all changes, substitutions, variations, alterations, and modifications to the example embodiments herein that a person having ordinary skill in the art would comprehend.

The figures, including photographs and drawings, comprised herewith may represent one or more implementations of the time-out synchronized system.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A method of calling timeouts in a sports game having timeouts that may be called by coaches, the method comprising:

equipping at least one coach of each team in a sports game having timeouts with a transmitter wherein each of the transmitters comprises a housing to store electronics therein and a button on the housing configured to transmit a signal over a network when the button is pressed by the respective coach to indicate the calling of a timeout by the respective coach;

equipping at least one referee of the sports game with a portable receiver wherein the portable receiver is configured to receive wireless signals in response to the wireless signals transmitted by the transmitters and configured to activate a distinctive alert in response to the received wireless signals to indicate that a timeout has been called and to indicate which team called the timeout;

playing the sports game;

a first one of the coaches from a first team pressing a button on a first one of the transmitters during the sports game to call a timeout wherein the first one of the transmitters transmits a first wireless signal;

activating a first distinctive alert from the portable receiver in response to receiving a wireless signal in response to the first wireless signal; and the at least one referee calling a timeout in response to the first distinctive alert from the portable receiver.

2. The method of claim 1 further comprising:

a second one of the coaches from a second team pressing a button on a second one of the transmitters during the sports game to call a timeout wherein the second one of the transmitters transmits a second wireless signal;

activating a second distinctive alert from the portable receiver in response to receiving a wireless signal in response to the second wireless signal wherein the first distinctive alert and the second distinctive alert are different to distinguish the teams calling the timeouts; and the at least one referee calling a timeout in response to the second alert from the portable receiver.

3. The method of claim 1 wherein the distinctive alert comprises a vibrator and an indicator indicating which team called the timeout.

4. The method of claim 3 wherein the portable receiver comprises a display and wherein the indicator comprises an indication on the display indicating which team called the timeout.

5. The method of claim 3 wherein the indicator comprises a light.

6. The method of claim 1 wherein each of the transmitters comprises a display configured to indicate the number of timeouts remaining, the method further comprising displaying the number of timeouts remaining on each of the transmitters.

7. The method of claim 1 wherein the sports game is basketball.

8. The method of claim 1 wherein the sports game is football.

9. A method of calling timeouts in a sports game having timeouts that may be called by coaches, the method comprising:

equipping at least one coach of each team in a sports game having timeouts with a transmitter wherein each of the transmitters comprises a housing to store electronics therein, a button on the housing configured to transmit a signal over a network when the button is pressed by the respective coach to indicate the calling of a timeout by the respective coach, and a display configured to indicate the number of timeouts remaining;

equipping at least one referee of the sports game with a portable receiver wherein the portable receiver is configured to receive wireless signals in response to the wireless signals transmitted by the transmitters and configured to activate a distinctive alert in response to the received wireless signals to indicate that a timeout has been called and to indicate which team called the timeout wherein the distinctive alert comprises a vibrator and an indicator indicating which team called the timeout;

playing the sports game;

a first one of the coaches from a first team pressing a button on a first one of the transmitters during the sports game to call a timeout wherein the first one of the transmitters transmits a first wireless signal;

activating a first distinctive alert from the portable receiver in response to receiving a wireless signal in response to the first wireless signal;

the at least one referee calling a timeout in response to the first distinctive alert from the portable receiver;

a second one of the coaches from a second team pressing a button on a second one of the transmitters during the sports game to call a timeout wherein the second one of the transmitters transmits a second wireless signal;

activating a second distinctive alert from the portable receiver in response to receiving a wireless signal in response to the second wireless signal wherein the first distinctive alert and the second distinctive alert are different to distinguish the teams calling the timeouts;

the at least one referee calling a timeout in response to the second alert from the portable receiver; and displaying the number of timeouts remaining on each of the transmitters.

10. A method of calling timeouts in a sports game having timeouts that may be called by coaches, the method comprising:

equipping at least one coach of each team in a basketball game having timeouts with a transmitter wherein each of the transmitters comprises a housing to store electronics therein, a button on the housing configured to transmit a signal over a network when the button is pressed by the respective coach to indicate the calling of a timeout by the respective coach, and a display configured to indicate the number of timeouts remaining;

equipping at least one referee of the basketball game with a portable receiver wherein the portable receiver is configured to receive wireless signals in response to the wireless signals transmitted by the transmitters and configured to activate a distinctive alert in response to the received wireless signals to indicate that a timeout has been called and to indicate which team called the timeout wherein the distinctive alert comprises a vibrator and an indicator indicating which team called the timeout;

playing the basketball game;

a first one of the coaches from a first team pressing a button on a first one of the transmitters during the basketball game to call a timeout wherein the first one of the transmitters transmits a first wireless signal;

activating a first distinctive alert from the portable receiver in response to receiving a wireless signal in response to the first wireless signal;

the at least one referee calling a timeout in response to the first distinctive alert from the portable receiver;

a second one of the coaches from a second team pressing a button on a second one of the transmitters during the basketball game to call a timeout wherein the second one of the transmitters transmits a second wireless signal;

activating a second distinctive alert from the portable receiver in response to receiving a wireless signal in response to the second wireless signal wherein the first distinctive alert and the second distinctive alert are different to distinguish the teams calling the timeouts;

the at least one referee calling a timeout in response to the second alert from the portable receiver; and displaying the number of timeouts remaining on each of the transmitters.

* * * * *